(12) United States Patent
Andrews

(10) Patent No.: US 9,380,410 B2
(45) Date of Patent: Jun. 28, 2016

(54) AUDIO COMMENTING AND PUBLISHING SYSTEM

(75) Inventor: Christopher C. Andrews, Los Altos, CA (US)

(73) Assignee: SOUNDLINK, INC., Los Altos, CA (US)

( * ) Notice: Subject to any disclaimer, the term of this patent is extended or adjusted under 35 U.S.C. 154(b) by 725 days.

(21) Appl. No.: 13/435,055

(22) Filed: Mar. 30, 2012

(65) Prior Publication Data

US 2012/0253795 A1 Oct. 4, 2012

Related U.S. Application Data

(60) Provisional application No. 61/471,541, filed on Apr. 4, 2011, provisional application No. 61/471,548, filed on Apr. 4, 2011, provisional application No. 61/471,552, filed on Apr. 4, 2011, provisional application No. 61/582,164, filed on Dec. 30, 2011, provisional application No. 61/488,954, filed on May 23, 2011.

(51) Int. Cl.
*G06F 15/16* (2006.01)
*H04W 4/02* (2009.01)
*H04N 21/432* (2011.01)

(52) U.S. Cl.
CPC ............... *H04W 4/02* (2013.01); *H04W 4/021* (2013.01); *H04N 21/432* (2013.01)

(58) Field of Classification Search
CPC ....... H04W 4/021; H04W 4/02; H04N 21/432
USPC .................................................. 709/217–219
See application file for complete search history.

(56) References Cited

U.S. PATENT DOCUMENTS

| | | | |
|---|---|---|---|
| 5,767,845 A * | 6/1998 | Oashi et al. .................... 715/209 |
| 6,526,411 B1 | 2/2003 | Ward | |
| 6,748,395 B1 | 6/2004 | Picker et al. | |
| 6,909,999 B2 | 6/2005 | Thomas et al. | |
| 7,349,923 B2 | 3/2008 | Spring et al. | |
| 7,680,288 B2 | 3/2010 | Melchior et al. | |
| 7,752,202 B2 | 7/2010 | Kobori et al. | |
| 7,870,197 B2 | 1/2011 | Lewis et al. | |
| 8,402,357 B1 * | 3/2013 | Norwood et al. ............. 715/202 |
| 8,452,887 B1 | 5/2013 | Stier | |

(Continued)

OTHER PUBLICATIONS

"Grace Digital Audio User Guide GDI-IR1000"—Sirius Retail, May 2010 http://www.siriusretail.com/product/Product_Families/SIRIUS/tab_inc/pdf/GDI-IR1000_UserGuide.pdf.

(Continued)

*Primary Examiner* — Mohamed Wasel
(74) *Attorney, Agent, or Firm* — Haverstock & Owens LLP

(57) ABSTRACT

An audio commenting and publishing system including a storage database, media content and a computing device all coupled together via a network. The computing device comprises a processor and an application executed by the processor configured to input audio data that a user wishes to associate with the media content from an audio recording mechanism or a memory device. The application is then able to store the audio data on the storage database and use the network address of the audio data along with the network address of the media content to publish the audio data and the media content such that a view is able to hear and access them concurrently at a network-accessible location.

59 Claims, 3 Drawing Sheets

(56) References Cited

U.S. PATENT DOCUMENTS

| | | |
|---|---|---|
| 8,589,169 B2 | 11/2013 | Bradley et al. |
| 8,606,383 B2 | 12/2013 | Jung et al. |
| 8,845,337 B1 | 9/2014 | Hu et al. |
| 2001/0023450 A1 | 9/2001 | Chu |
| 2002/0053078 A1 | 5/2002 | Holtz et al. |
| 2002/0091762 A1 | 7/2002 | Sohn et al. |
| 2002/0099552 A1 | 7/2002 | Rubin et al. |
| 2002/0107884 A1 | 8/2002 | Banerjee et al. |
| 2002/0147728 A1 | 10/2002 | Goodman et al. |
| 2003/0030659 A1 | 2/2003 | Wu |
| 2003/0069893 A1 | 4/2003 | Kanai et al. |
| 2003/0135857 A1 | 7/2003 | Pendakur et al. |
| 2004/0148353 A1* | 7/2004 | Karaoguz et al. ............ 709/205 |
| 2004/0181413 A1 | 9/2004 | Lui et al. |
| 2005/0038819 A1 | 2/2005 | Hicken et al. |
| 2005/0038826 A1 | 2/2005 | Bae et al. |
| 2005/0234983 A1 | 10/2005 | Plastina et al. |
| 2006/0195512 A1 | 8/2006 | Rogers et al. |
| 2006/0242106 A1 | 10/2006 | Bank |
| 2007/0118873 A1 | 5/2007 | Houh et al. |
| 2007/0299873 A1 | 12/2007 | Jones et al. |
| 2008/0074493 A1* | 3/2008 | Laughlin .................... 348/143 |
| 2008/0103906 A1 | 5/2008 | Singh |
| 2008/0114805 A1 | 5/2008 | Nord |
| 2008/0178251 A1 | 7/2008 | Shin |
| 2008/0201651 A1 | 8/2008 | Hong et al. |
| 2008/0243923 A1 | 10/2008 | Mazor et al. |
| 2009/0150445 A1 | 6/2009 | Herberger et al. |
| 2009/0164034 A1 | 6/2009 | Cohen et al. |
| 2009/0164902 A1 | 6/2009 | Cohen et al. |
| 2009/0186631 A1 | 7/2009 | Masarie, Jr. |
| 2009/0198357 A1 | 8/2009 | Logan et al. |
| 2009/0199083 A1 | 8/2009 | Sar et al. |
| 2010/0009698 A1 | 1/2010 | Yang et al. |
| 2010/0061197 A1 | 3/2010 | Yoshikawa et al. |
| 2010/0106852 A1 | 4/2010 | Kindig et al. |
| 2010/0114934 A1 | 5/2010 | Martensson |
| 2010/0125571 A1 | 5/2010 | White |
| 2010/0180753 A1 | 7/2010 | Chou et al. |
| 2010/0235466 A1 | 9/2010 | Jung et al. |
| 2010/0250587 A1 | 9/2010 | Schmitz |
| 2010/0257069 A1 | 10/2010 | Levy et al. |
| 2011/0040397 A1 | 2/2011 | Kraemer et al. |
| 2011/0061108 A1 | 3/2011 | Arrasvuori et al. |
| 2011/0072350 A1* | 3/2011 | Bachtiger .................... 715/727 |
| 2012/0254223 A1 | 10/2012 | Jotanovic et al. |
| 2013/0031208 A1* | 1/2013 | Linton et al. .................. 709/217 |
| 2013/0346075 A1* | 12/2013 | Felkai et al. .................. 704/235 |

OTHER PUBLICATIONS

SpeakEasy Voice Recorder Lite by Zarboo Software, Version 2.1 updated on Feb. 17, 2010 and available on iTunes; https://itunes.apple.com/us/app/speakeasy-voice-recorder-lite/id342738702.

* cited by examiner

AUDIO COMMENTING AND PUBLISHING SYSTEM

CROSS-REFERENCE TO RELATED APPLICATIONS

This application claims priority from U.S. Provisional Patent Application Ser. No. 61/471,541, filed Apr. 4, 2011 and entitled "AUDIO COMMENTING SYSTEM FOR THE INTERNET INCLUDING WEBSITES, SOCIAL NETWORKS, AND BLOGS," U.S. Provisional Patent Application Ser. No. 61/471,548, filed Apr. 4, 2011 and entitled "AUTOMATED SYSTEM FOR CREATING AND PUBLISHING INTERNET-BASED AUDIO PROGRAMMING," U.S. Provisional Patent Application Ser. No. 61/471,552, filed Apr. 4, 2011 and entitled "AUDIO RECORDING, PLAYBACK, AND PUBLISHING SYSTEM FOR CREATING VOICEOVERS, SOUNDTRACKS AND OTHER AUDIO PROGRAMMING FOR INTERNET CONTENT INCLUDING WEBSITES AND SOCIAL NETWORKS," U.S. Provisional Patent Application Ser. No. 61/582,164, filed Dec. 30, 2011 and entitled "AUTOMATIC AUDIO RECORDING AND PUBLISHING SYSTEM," and U.S. Provisional Patent Application Ser. No. 61/488,954, filed May 23, 2011 and entitled "LOCATION-BASED INTERNET RADIO PRODUCTION AND DISTRIBUTION SYSTEM," all of which are hereby incorporated herein by reference in its entirety.

FIELD OF THE INVENTION

The present invention relates to the field of Internet/network content. Specifically, the present invention relates to an audio commenting and publishing system for the Internet.

BACKGROUND OF THE INVENTION

In the past, the Internet has been essentially a quiet experience. The basic foundation of the Internet is that websites rarely have any audio associated with them that is relevant to that website. An exception to the Internet being quiet is music and video that are offered on the Internet, but in these cases, the website is used more as a delivery vehicle, to allow the user to stream or download the music or video, rather than to have the audio describe, enhance or relate to the website itself.

When there is audio associated with a website, the audio is generally hosted on the servers of the website owner, and the webmaster of the website placed the audio, meaning the audio location and the means for accessing that audio file, are directly on the website server within the website source code html. Or the webmaster uses audio that is not directly on the servers of the website, but it is still the webmaster that has access to the source code and html of the website and specialized skills, who adds audio to the website. These webmasters have specialized skills to add audio to a website and special access to be able to modify the source code or html of the website.

SUMMARY OF THE INVENTION

An audio commenting and publishing system including a storage database, media content and a computing device all coupled together via a network. The computing device comprises a processor and an application executed by the processor configured to input audio data that a user wishes to associate with the media content from an audio recording mechanism or a memory device. The application is then able to store the audio data on the storage database and use the network address of the audio data along with the network address of the media content to publish the audio data and the media content such that a viewer is able to hear and access them concurrently at a network-accessible location.

A first aspect of the application is directed to a method of concurrently providing audio data and media content at a network-accessible location. The method comprises accessing media content with an electronic device, inputting audio data to an audio commenting and publishing application on the electronic device from an audio recording mechanism or a memory, transmitting the audio data to a storage database and storing the audio data at an audio data network address on the storage database, capturing a media content network address from the accessed media content and providing the audio data and the media content at a network-accessible location using the audio data network address and the media content network address. In some embodiments, the audio data network address and the media content network address each comprise a universal resource locator. In some embodiments, the providing of the audio data and the media content comprises creating a single selection element at the network-accessible location, wherein upon selection the single selection element causes the audio data to be played and the media content to be accessed or displayed concurrently at the network-accessible location. In some embodiments, the providing of the audio data and the media content comprises creating an audio data selection element and a media content selection element at the network-accessible location, wherein upon selection the audio data selection element causes the audio data to be played and the media content selection element causes the media content to be accessed or displayed such that the audio content and the media content are able to be viewed concurrently at the network-accessible location. In some embodiments, the providing of the audio data and the media content comprises providing a playback feature of the audio commenting and publishing application at the network-accessible location, wherein upon selection of the audio data on the application the playback feature causes the audio data to be played and the media content to be accessed or displayed concurrently at the network-accessible location. In some embodiments, the network-accessible location comprises a website, an email, a text message, a tweet or a document. In some embodiments, the media content comprises a website, an email, a text message, a tweet or a document. In some embodiments, the method further comprises inputting metadata associated with the audio data and storing the metadata at the unique address. In some embodiments, the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored. In some embodiments, the method further comprises storing the audio data network address, the media content network address and the metadata as associated entries in a table of a master database along with all other previously inputted associated entries of audio data network addresses, media content network addresses and metadata on the storage database. In some embodiments, the method further comprises providing the master database and a sorting feature of the audio commenting and publishing application to the user such that the user is able to sort the entries of the table based on the metadata, the audio data network address, the media content network address or a combination thereof In some embodiments, the metadata further comprises the audio data converted into text. In some embodiments, the audio data further comprises image or video data.

A second aspect of the application is directed to a non-transitory computer-readable medium storing instructions that when executed by a computing device cause the computing device to perform. The method comprises inputting audio data from an audio recording mechanism or a memory, transmitting the audio data to a storage database and storing the audio data at an audio data network address on the storage database, capturing a media content network address from media content being accessed by the computing device and providing the audio data and the media content at a network-accessible location using the audio data network address and the media content network address. In some embodiments, the audio data network address and the media content network address each comprise a universal resource locator. In some embodiments, the providing of the audio data and the media content comprises creating a single selection element at the network-accessible location, wherein upon selection the single selection element causes the audio data to be played and the media content to be accessed or displayed concurrently at the network-accessible location. In some embodiments, the providing of the audio data and the media content comprises creating an audio data selection element and a media content selection element at the network-accessible location, wherein upon selection the audio data selection element causes the audio data to be played and the media content selection element causes the media content to be accessed or displayed such that the audio content and the media content are able to be viewed concurrently at the network-accessible location. In some embodiments, the providing of the audio data and the media content comprises providing a playback feature at the network-accessible location, wherein upon selection of the audio data the playback feature causes the audio data to be played and the media content to be accessed or displayed concurrently at the network-accessible location. In some embodiments, the network-accessible location comprises a website, an email, a text message, a tweet or a document. In some embodiments, the media content comprises a website, an email, a text message, a tweet or a document. In some embodiments, the method further comprises inputting metadata associated with the audio data and storing the metadata at the unique address. In some embodiments, the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored. In some embodiments, the method further comprises storing the audio data network address, the media content network address and the metadata as associated entries in a table of a master database along with all other previously inputted associated entries of audio data network addresses, media content network addresses and metadata on the storage database. In some embodiments, the method further comprises providing the master database and a sorting feature to the user such that the user is able to sort the entries of the table based on the metadata, the audio data network address, the media content network address or a combination thereof. In some embodiments, the metadata further comprises the audio data converted into text. In some embodiments, the audio data further comprises image or video data.

Another aspect of the application is directed to a computing device for concurrently providing audio data and media content. The computing device comprises a processor and an application executed by the processor configured to input audio data from an audio recording mechanism or a memory, transmit the audio data to a storage database and storing the audio data at an audio data network address on the storage database, capture a media content network address from media content being accessed by the computing device and provide the audio data and the media content at a network-accessible location using the audio data network address and the media content network address. In some embodiments, the audio data network address and the media content network address each comprise a universal resource locator. In some embodiments, the providing of the audio data and the media content comprises creating a single selection element at the network-accessible location, wherein upon selection the single selection element causes the audio data to be played and the media content to be accessed or displayed concurrently at the network-accessible location. In some embodiments, the providing of the audio data and the media content comprises creating an audio data selection element and a media content selection element at the network-accessible location, wherein upon selection the audio data selection element causes the audio data to be played and the media content selection element causes the media content to be accessed or displayed such that the audio content and the media content are able to be viewed concurrently at the network-accessible location. In some embodiments, the providing of the audio data and the media content comprises providing a playback feature of the application at the network-accessible location, wherein upon selection of the audio data the playback feature causes the audio data to be played and the media content to be accessed or displayed concurrently at the network-accessible location. In some embodiments, the network-accessible location comprises a website, an email, a text message, a tweet or a document. In some embodiments, the media content comprises a website, an email, a text message, a tweet or a document. In some embodiments, the processor is further configured to input metadata associated with the audio data and storing the metadata at the unique address. In some embodiments, the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored. In some embodiments, the processor is further configured to store the audio data network address, the media content network address and the metadata as associated entries in a table of a master database along with all other previously inputted associated entries of audio data network addresses, media content network addresses and metadata on the storage database. In some embodiments, the processor is further configured to provide the master database and a sorting feature of the audio commenting and publishing application to the user such that the user is able to sort the entries of the table based on the metadata, the audio data network address, the media content network address or a combination thereof. In some embodiments, the metadata further comprises the audio data converted into text. In some embodiments, the audio data further comprises image or video data. In some embodiments, the storage database is integrated with the computing device. In some embodiments, the network-accessible location is located within the computing device. In some embodiments, the audio recording mechanism is integrated with the computing device.

Yet another aspect of the application is directed to a system for concurrently providing audio data and media content. The system comprises a storage database, media content and a computing device coupled with the storage database and the media content, wherein the computing device comprises a processor and an application executed by the processor configured to input audio data from an audio recording mechanism or a memory, transmit the audio data to the storage database and storing the audio data at an audio data network address on the storage database, capture a media content network address from the media content and provide the audio data and the media content at a network-accessible location using the audio data network address and the media content network address. In some embodiments, the audio data network address and the media content network address each comprise a universal resource locator. In some embodiments, the providing of the audio data and the media content comprises creating a single selection element at the network-accessible location, wherein upon selection the single selection element causes the audio data to be played and the media content to be accessed or displayed concurrently at the network-accessible location. In some embodiments, the providing of the audio data and the media content comprises creating an audio data selection element and a media content selection element at the network-accessible location, wherein upon selection the audio data selection element causes the audio data to be played and the media content selection element causes the media content to be accessed or displayed such that the audio content and the media content are able to be viewed concurrently at the network-accessible location. In some embodiments, the providing of the audio data and the media content comprises providing a playback feature of the application at the network-accessible location, wherein upon selection of the audio data the playback feature causes the audio data to be played and the media content to be accessed or displayed concurrently at the network-accessible location. In some embodiments, the network-accessible location comprises a website, an email, a text message, a tweet or a document. In some embodiments, the media content comprises a website, an email, a text message, a tweet or a document. In some embodiments, the system further comprises inputting metadata associated with the audio data and storing the metadata at the unique address. In some embodiments, the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored. In some embodiments, the system further comprises storing the audio data network address, the media content network address and the metadata as associated entries in a table of a master database along with all other previously inputted associated entries of audio data network addresses, media content network addresses and metadata on the storage database. In some embodiments, the system further comprises providing the master database and a sorting feature of the application to the user such that the user is able to sort the entries of the table based on the metadata, the audio data network address, the media content network address or a combination thereof. In some embodiments, the metadata further comprises the audio data converted into text. In some embodiments, the audio data further comprises image or video data. In some embodiments, the storage database is integrated with the computing device. In some embodiments, the network-accessible location is located within the computing device. In some embodiments, the audio recording mechanism is integrated with the computing device. In some embodiments, the network-accessible location is located within the storage database.

DETAILED DESCRIPTION OF THE INVENTION

The audio commenting and publishing system described herein enables a user to create, store and publish audio data/comments (e.g. spoken words) in association with other network content. Specifically, the system enables a user to observe network content such as a website and create audio data that the user wishes to associated with the network content such as a personal opinion on the website. In response the system is able to automatically store the created audio data, create links to the stored audio data and the network content and publish the links at one or more network locations such as a custom webpage wherein at the network location others are able to view the network content while hearing the audio data. As a result, the audio commenting and publishing system provides the benefit of enabling people to communicate the tone and other information in audio data that is lost when converted to text. Further, the system has the advantage of running independently of the network content that the audio data is associated with because this system does not need to alter the network content itself, rather it merely captures the network address of the network content.

Figure 1:
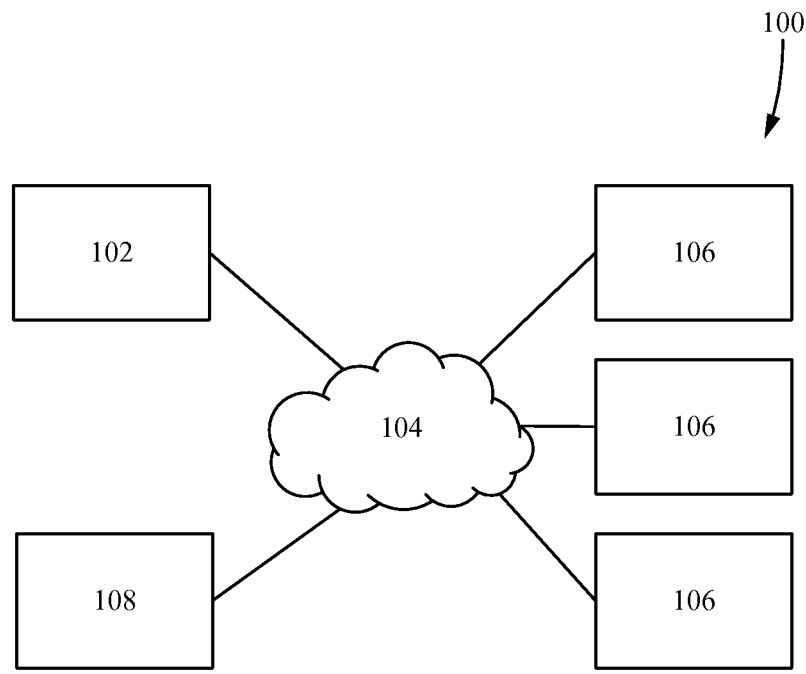
FIG. 1 illustrates an audio commenting and publishing system according to some embodiments.

FIG. 1 illustrates an audio commenting and publishing system 100 according to some embodiments. As shown in FIG. 1, the audio commenting and publishing system 100 comprises one or more electronic devices 102 having an audio commenting and publishing application, one or more content entities 106 and one or more storage elements/databases 108 coupled together via one or more networks 104. In some embodiments, one or more of the content entities 106 are located on the electronic device 102 such that one of the networks 104 comprise an internal network of the electronic device 102. For example, the electronic device 102 is able to be a laptop computer and the content entity 106 is able to be a word document stored on the laptop computer. In some embodiments, one or more of the storage elements 108 is integrated with the electronic device 102. For example, one of the storage elements 108 is able to be the local memory on the electronic device 102. Alternatively, the storage elements 108 are able to be integrated with one or more of the content entities 106 and/or are able to be remote storage devices separate from both the electronic device 102 and the content entities 106. In some embodiments, the commenting and publishing application is stored and runs locally on the electronic device 102. Alternatively, the audio commenting and publishing application is able to be partially or fully stored and/or executed remotely on a device separate from but coupled with the electronic device 102 over the network(s) 104. For example, the audio commenting and publishing application is able to be stored and executed on a remote server coupled to the device 102 via the network 104. In some embodiments, a user downloads the audio commenting and publishing application onto the electronic device 102. Alternatively, the audio commenting and publishing application is able to come pre-installed on the electronic device 102.

In some embodiments, the electronic device 102 comprises a mobile computing device such as a smart phone, computer or computing component within a vehicle. Alternatively, the electronic device 102 is able to comprise a mobile phone or other type of computing and/or networking device. In some embodiments, the one or more networks 104 comprise the internet. Alternatively, the one or more networks 104 are able to be any combination of wired and/or wireless networks such as the internet, an ethernet or other types of networks capable of transmitting audio data as are well known in the art. In some embodiments, the content entities 106 comprise a website or webpage. Alternatively, the content entities 106 are able to be any network-accessible software and/or hardware entity such as websites, blogs, twitter, email, documents, document review programs and other types of network content and the hardware that store and run them. For example, one of the entities 106 is able to be a newspaper's online website having a webpage including a news article that a user wants to associate an audio comment with. Alternatively, one of the entities 106 is able to be a Facebook page including photos that a user wishes to associate an audio comment with. Alternatively, one of the entities 106 is able to be a text document of a text editing program such as Microsoft Word, wherein an editor of the document wishes to associate verbal comments with the document.

In some embodiments, the storage elements 108 comprise a server. For example, the storage elements 108 are able to comprise the server that runs one of the content entities 106. Alternatively, the storage elements 108 comprise other types of data storage/memory devices as are well known in the art. In some embodiments, one or more of the storage elements 108 comprise a master database that includes a table or list of all stored audio data, the web/network address of the stored audio data, the metadata associated with the audio data, the web/network address of the content entities 106 and the metadata associated with the content entities 106. For example, the master database is able to be stored on the device 102 on a storage element 108 that is integrated with the device 102 such that the application is able to access the master database locally. Alternatively, the master database is able to be stored on one or more storage elements 108 remote from the device 102 such that the application accesses the master database remotely.

The entries within the master database are able to be sorted/filtered by a user for selecting one or more desired entries and publishing or republishing said entries using the audio commenting and publishing application as described below. For example, a user is able to access the master database via a sorting feature of the commenting and publishing application and filter/sort the data by one or more parameters/characteristics and combinations thereof in order to return a list of filtered audio and associated data. In particular, the parameters/characteristics are able to comprise metadata of the audio data, metadata of the content entities 106 and/or the characteristics of the audio data. For example, the parameters/characteristics are able to comprise the web address of the associated content entity 106, the source or person who created the audio data, subject of the associated content entity 106, where the audio data was created, when the audio data was created, length of the audio data, size of the audio data, format of the audio data, subject of the audio data or other characteristics of the audio data or content entities 106 as are well known in the art. As a result, the system 100 provides the benefit of enabling a user to utilize the audio commenting and publishing application and the master database to organize, access and selectively publish all the data stored in the system 100.

In operation, a user utilizes the electronic device 102 to access one or more of the content entities 106. The user then activates the audio commenting and publishing application of electronic device 102 and utilizes a record feature of the application to record the audio data they wish to associate with the accessed content entities 106. The application is then able to automatically store and format the recorded audio data on the storage elements 108. In some embodiments, the audio data is stored locally on the electronic device 102 and then copied or transferred onto the storage elements 108 over the network(s) 104. Alternatively, the audio data is able to directly stored on the storage elements 108, for example, by streaming the audio data to the storage elements 108. Further, the application is able to automatically create a unique web address of the stored audio data, automatically capture the network address of the subject content entities 106 and automatically parse metadata about the content entities 106 and the recorded audio data such that it all is able to be stored with the recorded audio data on the storage elements 108. Alternatively, the metadata and/or network addresses are able to be manually input into the application by the user for storage with the audio data. In some embodiments, the web address of the recorded audio data and/or the content entities 106 comprises a universal resource locator (URL) that is able to be used to create a link or links to the recorded audio and the content entities 106.

As a result, the user is able to utilize the application to publish the audio data with the content entities 106 for others to view simultaneously or concurrently. In some embodiments, the publishing comprises inserting a single combined link into a network-accessible location (e.g. webpage), wherein when selected the combined link causes the audio data to be played as well as the content entity 106 to be accessed/displayed. Alternatively, the publishing comprises inserting a plurality of links into a network-accessible location such that the links are able to be separately selected to play the audio data and display the content entities 106 concurrently. Alternatively, the publishing is able to comprise generating a playback module of the application that enables users to select one or more audio data entries on the system 100 and automatically plays the selected audio data and displays the associated content entities 106. Alternatively, the publishing is able to comprise other publishing methods utilizing the associated audio data and content entity data stored on the storage elements as are well known in the art. Consequently, other individuals accessing the content entities 106 are able to select and listen to the audio data while accessing one or more of the associated content entities 106. Accordingly, the system 100 provides the benefit of automatically processing the audio comments/data, formatting the data into an audio file accessible on the network and providing access to that audio file along with the associated content entities 106 for simultaneous or concurrent execution. Further, the system 100 provides the benefit of being able to run independently of the content entities 106 because the system 100 not alter the data associated with the operation of the content entity 106 such as the html code of a website.

Figure 2:
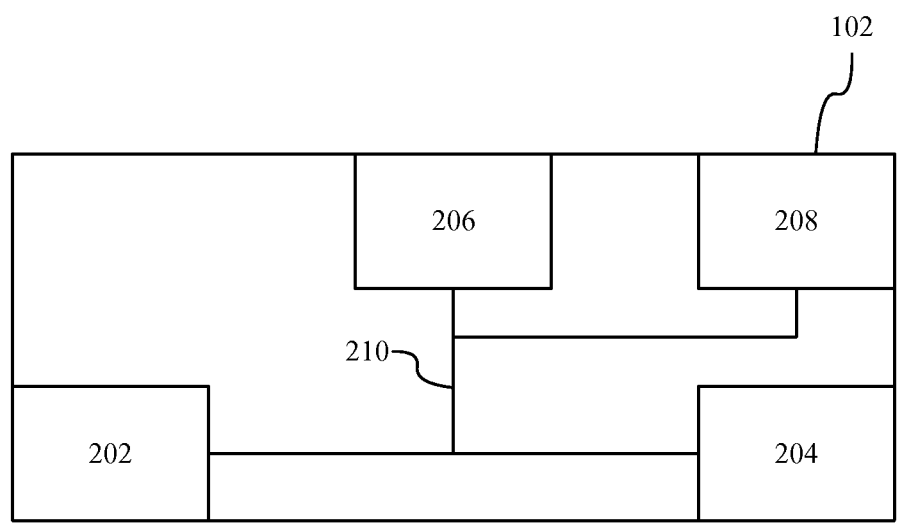
FIG. 2 illustrates an audio commenting and publishing device according to some embodiments.

FIG. 2 illustrates the electronic device 102 according to some embodiments. As shown in FIG. 2, the electronic device 102 comprises a central processing unit (CPU) 202 for executing the audio commenting and publishing application and controlling the operation of the electronic device 102, a memory 204 for locally storing the audio commenting and publishing application and the recorded audio if necessary, an input/output interface 206 for inputting commands from a user and outputting the audio data to the storage elements 108 via the network(s) 104, an audio recording mechanism 208 for recording the audio and one or more buses 210 for coupling the components of the electronic device 102 together. Additionally, it is understood that the electronic device 102 is able to comprise one or more additional components well known in the art, which have not been included herein for the sake of brevity.

In operation, when a user wishes to record and associate audio with one or more content entities 106 being accessed via the electronic device 102, they input an activation command to the input/output interface 206 causing the CPU 202 to execute the audio commenting and publishing application. In some embodiments, the activation comprises a voice command input by the recording mechanism 208. Alternatively, the activation comprises one or more of a voice command, the pressing of a button on the device 102 and/or other triggering actions as are well known in the art. Upon being activated, the audio commenting and publishing application enables the user to begin recording audio using the audio recording mechanism 208 by issuing a "record" command using a recording feature of the audio recording mechanism 208. Alternatively, the activation command is able to automatically issue the "record" command to the recording mechanism 208 without requiring any second or subsequent actions by the user. The device 102 is then able to capture the network address of the content entities 106, parse the metadata of the content entities 106 and the audio data, and transmit the audio data, metadata and network addresses using the I/O interface 206 to the storage elements 108 where the data is formatted and saved. Accordingly, the associated audio data and content entities 106 are able to be published such that others are able to access the audio content on the content entity 106 simultaneously or concurrently.

In some embodiments, the memory 204 comprises non-volatile memory. Alternatively, the memory 204 comprises one or both of non-volatile and volatile memory. In some embodiments, the input/output interface 206 comprises a display with a graphical user interface (GUI) for receiving commands from the user. Alternatively, the input/output interface 206 comprises one or more of a display, a GUI, a voice recognition mechanism, transceiver, device physical inputs, peripherals such as mice and keyboards, and other interface components as are well known in the art. In some embodiments, the audio recording mechanism 208 is integrated into the device 102. Alternatively, the recording mechanism 208 is able to be a peripheral device that is coupled to the electronic device 102 via the network(s) 104 or another wired or wireless network. In some embodiments, the recording mechanism 208 comprises a voice recorder. Alternatively, the recording mechanism 208 is able to be other types of audio and/or video recording devices/mechanisms that are able to record any kind of sound the user desires, such as their voice to music or pre-recorded sound effects as are well known in the art. In some embodiments, the recording mechanism 208 comprises recording software stored and executed on the electronic device 102. Alternatively, the recording software is able to be partially or fully remotely executed and/or stored from the device 102. For example, the recording software is able to be remotely stored and/or executed on a website server coupled with the electronic device 102 over the network 102. Some exemplary types of such recording software include Quicktime that runs from a hard drive of a computer, Javasonics.com or Pubclip.com or Byoaudio.com that run from a web-based application, and Voice Memo that runs on an iPhone. Alternatively, the recording mechanism 208 does not include recording software and the recording and/or editing functionality is implemented by a recording feature of the audio commenting and publishing application. In some embodiments, the recording application comprises one or more editing functions such that the inputted and recorded data is able to be edited.

Figure 3A:
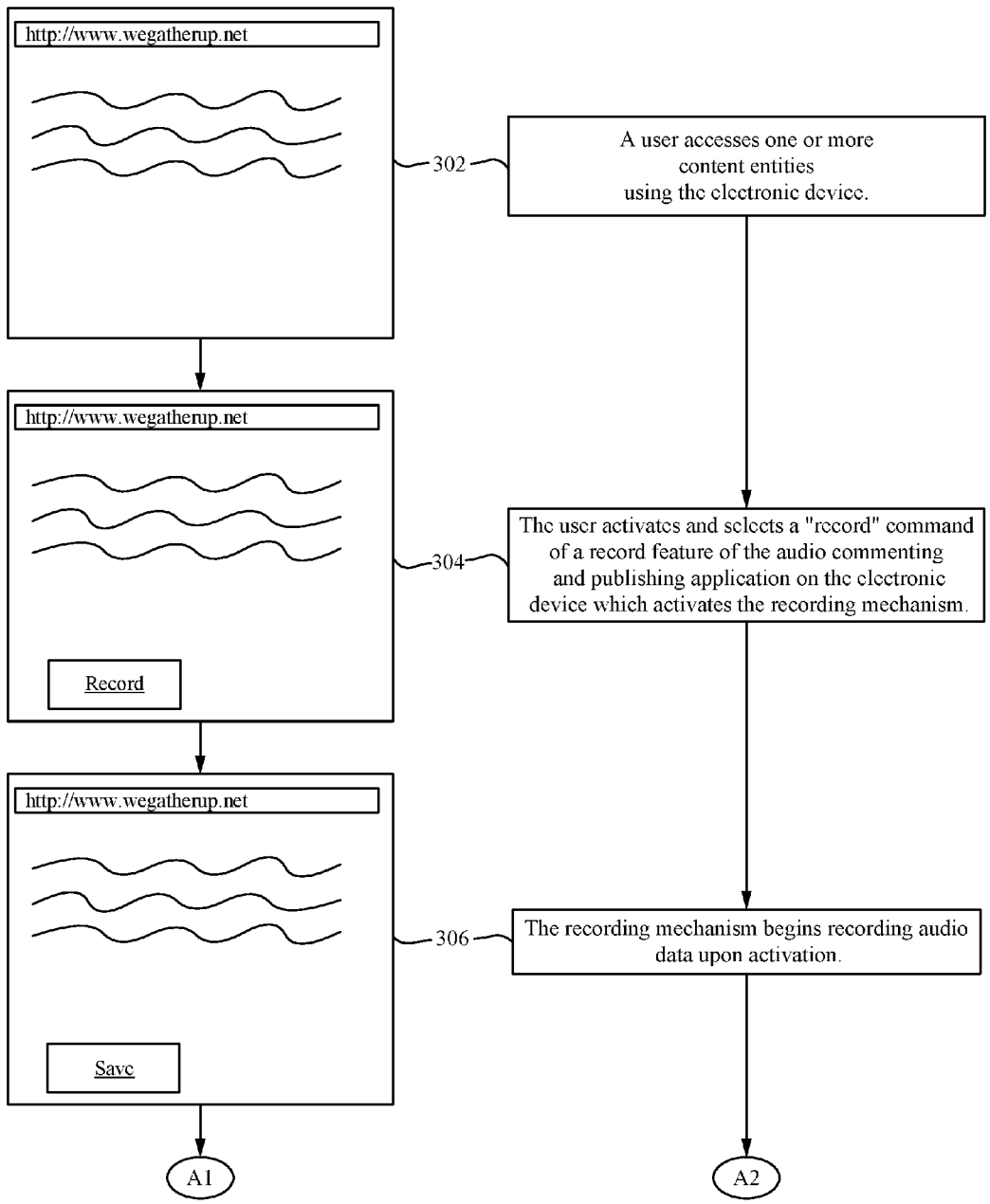
FIGS. 3A and 3B illustrate a flowchart of a method of concurrently providing audio data and media content at a network-accessible location according to some embodiments.
Figure 3B:
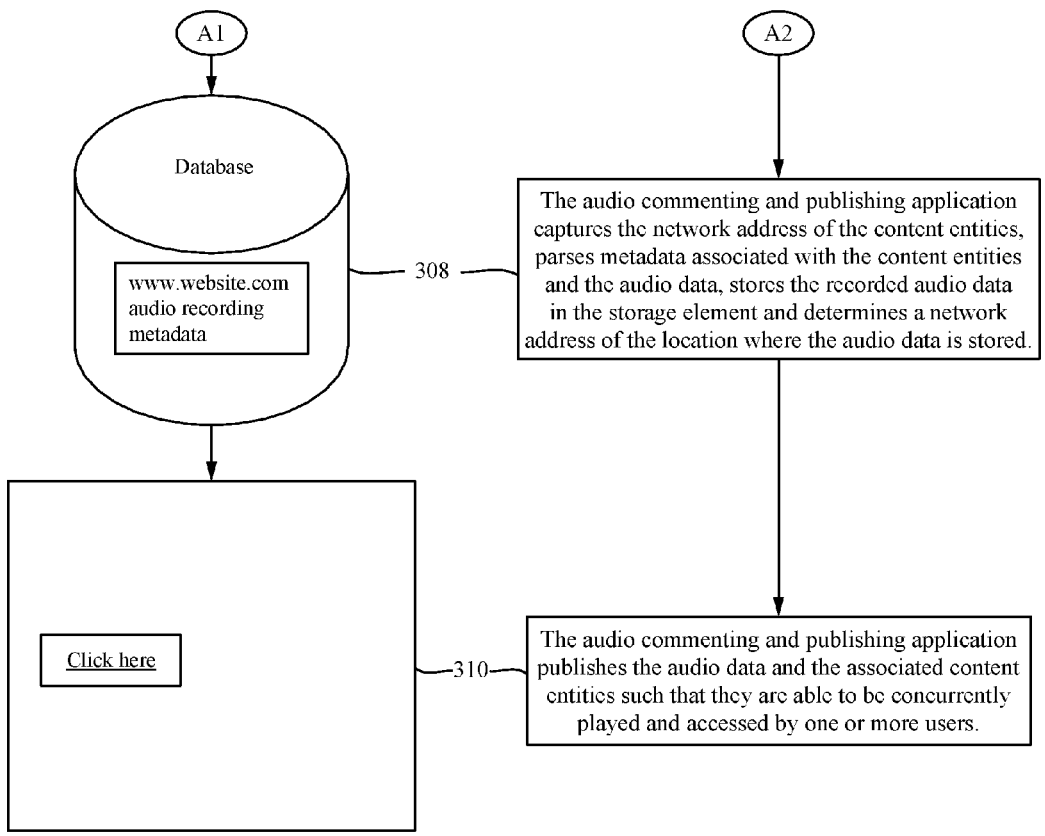

FIGS. 3A and 3B illustrate a flowchart of a method of operating the audio commenting and publishing system 100 according to some embodiments. As shown in FIG. 3, a user accesses one or more content entities 106 using the electronic device 102 at the step 302. The user activates and selects a "record" command of a record feature of the audio commenting and publishing application on the electronic device 102 which activates the recording mechanism 208 at the step 304. In some embodiments, the activation and/or selecting of the "record" command of the audio commenting and publishing application comprises clicking on activation and/or record buttons on the electronic device 102. Alternatively, the activation and/or selection are able to comprise touching a touch screen of the device 102, issuing voice commands to the device 102 or other activation and/or selection methods as are well known in the art. In some embodiments, the activation of the commenting application automatically causes the recording mechanism 208 to be activated and begin recording without the user issuing a "record" command. In some embodiments, upon activation a graphical user interface (GUI) of the application appears to the user on the electronic device 102, wherein the interface comprises a recording feature. In some embodiments, the recording feature displayed by the interface comprises a single "record" button. Alternatively, the display of the recording features is able to comprise other recording and editing features as are well known in the art. In some embodiments, the appearance of the application and/or the recording feature is minimized on the GUI such that the application and/or the recording feature only minimally interferes visually with the accessed content entities 106. In some embodiments, this minimization comprises any combination of causing the application and/or the recorder feature to be partially transparent, small, positioned in the periphery or other methods as are well known in the art. As a result, the system 100 provides the benefit of enabling the user to observe the content entities 106 without the application blocking the view of the page.

The recording mechanism 208 begins recording audio data upon activation at the step 306. In some embodiments, the audio data comprises the user's voice. In some embodiments, the recording mechanism 208 comprises a text to audio translation element such that the audio data recorded by the recording mechanism 208 is able to comprise inputted text that has been converted into audio data. In some embodiments, the text to be converted into audio data is input to the audio commenting and publishing application using the input/output interface 206 of the electronic device 102. In some embodiments, the text to audio translation element is AT&T Natural Voices. Alternatively, step 306 is able to be omitted and/or the audio data is able to be imported from existing audio data stored on a memory coupled with the commenting and publishing application via the network(s) 104. For example, a user is able to import previously recorded or downloaded audio files to the commenting and publishing application instead of or in addition to recording new audio data using the recording mechanism 208.

The audio commenting and publishing application captures the network address of the content entities 106, parses metadata associated with the content entities 106 and the audio data, stores the recorded audio data in the storage element 108 and determines a network address of the location where the audio data is stored at the step 308. In some embodiments, the network addresses are URLs such that they network addresses are able to be used to create links to and/or to play/display the audio data and content entities 106. In some embodiments, the metadata comprises one or more of the name of the source/person who input the audio data, the time the audio data was created, where the audio data was created, the subject of the audio data, the size of the data, the length of the data, the format of the data, the subject of the content entities 106 and other types of information related to the audio data and/or the content entities 106 as is well known in the art.

In some embodiments, the user is also able to import text data and/or a network address of the audio data with the recorded audio data into the application. In such embodiments, the parsing is able to comprise automatically distinguishing the imported text data, the imported network address and/or the audio data from the received data such that the text data and/or network address are able to be associated with the audio data and stored on the storage elements 108. As a result, utilizing the master database, the audio data entries/files are able to be filtered, organized or searched for based on the text data and/or network address using the sorting feature of the application. In some embodiments, the added text data is able to be translated speech to text from the audio data. As a result, the words used in the audio data are able to be utilized to organize, sort and/or filter the audio data and its associated data. For example, a user is able to retrieve all audio data about politics by searching textual translations of the audio data for the word politics. In particular, this function has the advantage of not having to rely on the accuracy of the metadata associated with the audio data to retrieve the desired results. In some embodiments, this process is able to be operated using voice commands. In some embodiments, this process is able to be automated such that the application controls the recording and translation of the speech to text or text to speech and the transmitting of that data with the other data (e.g. network address) to the storage elements 108.

The audio commenting and publishing application publishes the audio data and the associated content entities 106 such that they are able to be concurrently played and accessed by one or more users at the step 310. In some embodiments, the publishing comprises providing a playback feature of the application to the user, wherein the playback feature enables the user to select one or more audio files and automatically plays the selected audio files and accesses/displays the associated content entities 106. In particular, the selection of the audio files is able to be performed using a sorting/filtering function of the application that enables the user to find desired audio files by sorting/filtering the audio data by one or more parameters or characteristics as described above. In some embodiments, the publishing comprises presenting a single "combined" link to the user via the interface 206, wherein when selected the single link causes the audio data to begin playing and the content entities 106 to be accessed/displayed. The single link is able to be created based on the network address of the audio data and the network address of the content entities 106. In some embodiments, the single link is able to be accomplished by use of batch or automated methods of making more than one action occur at a time or in sequence such that the audio data and the content entities 106 are launched either simultaneously, concurrently or in close succession. Alternatively, the publishing comprises presenting a plurality of links each associated with a content entity 106 or the audio data via the interface 206, wherein when selected the links cause the associated data to be accessed/played.

In some embodiments, a plurality of the audio data and associated content entities 106 are able to be published together. For example, the application is able to automatically or upon instruction by a user determine all of the audio data entries that have one or more common characteristics/parameters by utilizing the sorting/filtering feature described above and publish those determined audio data entries with their associated content entities 106 at one network-accessible location (e.g. one bulletin board website). In some embodiments, the application automatically inserts the link or links into a network-accessible location such as a newly created website, an email, a twitter feed, a text message, a document or an existing website. In particular, in some embodiments the application is able to receive login information related to a network-accessible location such that the application is able to automatically sign onto the network-accessible location using the login information and insert the link or links into the location. In some embodiments, the link or links are automatically displayed to the user by the application through one of many different publishing technologies such as Java or DHTML or push technologies. Alternatively, the link or links are able to be presented to the user by being automatically emailed to the user by the commenting application or placed in a predetermined file on the electronic device 102 by the commenting application. Alternatively, the link or links are able to be manually selected by the user for display by interacting with the audio commenting and publishing application. In some embodiments, the user is able to add text to be displayed with the link or links. In particular, the audio commenting and publishing application is able to input and/or preselect text to be automatically displayed along with the link or links. For example, the preselected text is able to comprise metadata associated with the audio data and/or custom text entered by the user such as "Listen to my comments."

In some embodiments, the publishing is able to comprise presenting multiple links corresponding to different audio files and associated content entities 106 along with a script that when executed causes the audio files and associated content entities 106 to be played/accessed in a defined order (e.g. like a slide show). In some embodiments, the publishing comprises automatically creating a new website or other type of network-accessible content that automatically plays the audio data and displays the content entities 106 when the website is accessed. Alternatively, the new website or other type of network-accessible content are able to include a link or links that when selected play the audio data and display the content entities 106. Alternatively, a graphic or advertisement such as a banner ad associated with the new website is able to begin playback of the audio data and presentation of the content entities 106.

In some embodiments, the publishing comprises adding playback of the audio data to existing ads, including but not limited to graphic ads and text ads. For example, the audio commenting and publishing application is able to launch audio data and associated content entities 106 without changing the existing icon, link, or graphic of the ad that the user selects to reach the content entities 106. In this way, a company that utilizes online text ads is able to add audio data to textual ads this without changing the existing text or graphic of the ad. In such embodiments, the application comprises an ad interface feature that interfaces with the ad system, whereby the ad interface feature processes and transmits to the ad system the proper network address and/or hypertext markup language code (HTML code) necessary to include the audio data with the ads, without changing the existing ad HTML code. For example, an advertiser is able to select the webpage that their ad, which they want to add audio data to, links to, and then record the desired audio data utilizing the audio commenting and publishing application such that the audio recording HTML replaces the HTML in the existing ad, without changing the actual icon or text of the ad that a user clicks on. Further, in such embodiments the selection icon or graphic of the existing ad is able to be input to the application during the audio data creation and recording process and automatically stored into the storage elements 108 for use.

The audio commenting and publishing system 100 described herein has numerous advantages. Specifically, the system provides the advantage of enabling users to associate audio comments with content entities 106 such that their comments are able to be shared with others viewing the content entities 106. Further, the system provides the advantage of creating a distinct URL for any audio comment and any desired associated information about that recording within a storage element/database 108 that is able to be accessible by computer programs for organizing, sorting, and display based on the metadata and/or other data. Moreover, the system provides the advantage of enabling a user to utilize the audio commenting and publishing application and the master database to organize and access all the data stored in the system 100. Finally, the system provides the advantage of enabling a user to add textual and other data that is able to be presented with their comments.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. In particular, it should be noted that although as described herein, the system is taught as combining sound recordings with content, the system is able to operate substantially similarly while combining images and/or video recordings with content. For example, a user is able to take a picture and/or record video and audio data about content and then associate the audio, image and video data with the content utilizing the system. Alternatively, the user is able to utilize an A/V recorder, but only record video or only record audio for association with the target content. As a result, additional data formats for the recorded data are available including audio formats, video formats, and audio/video formats. It also should be noted that although the system is described herein in relation to internet content, the target content is able to be other types of content such as editable text document. For example, the target content is able to be a Microsoft Word document wherein the created link is able to be inserted into the document.

What is claimed is:

1. A method of concurrently providing audio data and media content at a network-accessible location, the method comprising:
   a. accessing non-audio media content from a network-accessible location with an electronic device;
   b. inputting audio data to an audio commenting and publishing application on the electronic device from an audio recording mechanism or a memory;
   c. transmitting the audio data to a storage database separate from and not associated with the network-accessible location and storing the audio data at an audio data network address on the storage database;
   d. capturing parameters comprising a media content network address from the accessed non-audio media content and storing the parameters with the audio data on the storage database, wherein the media content network address points to the network accessible location; and
   e. providing the audio data and the non-audio media content at a network-accessible location using the audio data network address and the media content network address.

2. The method of claim 1, wherein the audio data network address and the media content network address each comprise a universal resource locator.

3. The method of claim 2, wherein the providing of the audio data and the non-audio media content comprises creating a single selection element at the network-accessible location, wherein upon selection the single selection element causes the audio data to be played and the non-audio media content to be accessed or displayed concurrently at the network-accessible location.

4. The method of claim 2, wherein the providing of the audio data and the media content comprises creating an audio data selection element and a media content selection element at the network-accessible location, wherein upon selection the audio data selection element causes the audio data to be played and the media content selection element causes the non-audio media content to be accessed or displayed such that the audio content is able to be played and the non-audio media content is able to be viewed at the same time at the network-accessible location.

5. The method of claim 2, wherein the providing of the audio data and the non-audio media content comprises providing a playback feature of the audio commenting and publishing application at the network-accessible location, wherein upon selection of the audio data on the application the playback feature causes the audio data to be played and the non-audio media content to be accessed or displayed concurrently at the network-accessible location.

6. The method of claim 1, wherein the network-accessible location comprises a website, an email, a text message, a tweet or a document.

7. The method of claim 1, wherein the non-audio media content comprises a website, an email, a text message, a tweet or a document.

8. The method of claim 1, further comprising inputting metadata associated with the audio data and storing the metadata at the unique address.

9. The method of claim 8, wherein the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored.

10. The method of claim 9, further comprising storing the audio data network address, the media content network address and the metadata as associated entries in a table of a master database along with all other previously inputted associated entries of audio data network addresses, media content network addresses and metadata on the storage database.

11. The method of claim 10, further comprising providing the master database and a sorting feature of the audio commenting and publishing application to the user such that the user is able to sort the entries of the table based on the metadata, the audio data network address, the media content network address or a combination thereof.

12. The method of claim 11, wherein the metadata further comprises the audio data converted into text.

13. The method of claim 1, wherein the audio data further comprises image or video data.

14. A non-transitory computer-readable medium storing instructions that when executed by a computing device cause the computing device to perform the method comprising:
   a. inputting audio data from an audio recording mechanism or a memory;
   b. transmitting the audio data to a storage database and storing the audio data at an audio data network address on the storage database;
   c. capturing parameters comprising a media content network address from non-audio media content being accessed by the computing device and storing the parameters with the audio data on the storage database, wherein the media content network address points to a network accessible location that is separate from and not associated with the storage database; and
   d. providing the audio data and the non-audio media content at a network-accessible location using the audio data network address and the media content network address.

15. The medium of claim 14, wherein the audio data network address and the media content network address each comprise a universal resource locator.

16. The medium of claim 15, wherein the providing of the audio data and the non-audio media content comprises creating a single selection element at the network-accessible location, wherein upon selection the single selection element causes the audio data to be played and the non-audio media content to be accessed or displayed concurrently at the network-accessible location.

17. The medium of claim 15, wherein the providing of the audio data and the non-audio media content comprises creating an audio data selection element and a media content selection element at the network-accessible location, wherein upon selection the audio data selection element causes the audio data to be played and the media content selection element causes the non-audio media content to be accessed or displayed such that the audio content is able to be played and the non-audio media content is able to be viewed at the same time at the network-accessible location.

18. The medium of claim 15, wherein the providing of the audio data and the non-audio media content comprises providing a playback feature at the network-accessible location, wherein upon selection of the audio data the playback feature causes the audio data to be played and the non-audio media content to be accessed or displayed concurrently at the network-accessible location.

19. The medium of claim 14, wherein the network-accessible location comprises a website, an email, a text message, a tweet or a document.

20. The medium of claim 14, wherein the non-audio media content comprises a website, an email, a text message, a tweet or a document.

21. The medium of claim 14, wherein the method further comprises inputting metadata associated with the audio data and storing the metadata at the unique address.

22. The medium of claim 21, wherein the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored.

23. The medium of claim 22, wherein the method further comprises storing the audio data network address, the media content network address and the metadata as associated entries in a table of a master database along with all other previously inputted associated entries of audio data network addresses, media content network addresses and metadata on the storage database.

24. The medium of claim 23, wherein the method further comprises providing the master database and a sorting feature to the user such that the user is able to sort the entries of the table based on the metadata, the audio data network address, the media content network address or a combination thereof.

25. The medium of claim 24, wherein the metadata further comprises the audio data converted into text.

26. The medium of claim 14, wherein the audio data further comprises image or video data.

27. A computing device for concurrently providing audio data and non-audio media content comprising:
   a. a processor; and
   b. an application executed by the processor configured to:
      i. input audio data from an audio recording mechanism or a memory;
      ii. transmit the audio data to a storage database and storing the audio data at an audio data network address on the storage database;
      iii. capture parameters comprising a media content network address from non-audio media content being accessed by the computing device and store the parameters with the audio data on the storage database, wherein the media content network address points to a network-accessible location that is separate from and not associated with the storage database; and
      iv. provide the audio data and the non-audio media content at a network-accessible location using the audio data network address and the media content network address.

28. The device of claim 27, wherein the audio data network address and the media content network address each comprise a universal resource locator.

29. The device of claim 28, wherein the providing of the audio data and the non-audio media content comprises creating a single selection element at the network-accessible location, wherein upon selection the single selection element causes the audio data to be played and the non-audio media content to be accessed or displayed concurrently at the network-accessible location.

30. The device of claim 28, wherein the providing of the audio data and the non-audio media content comprises creating an audio data selection element and a media content selection element at the network-accessible location, wherein upon selection the audio data selection element causes the audio data to be played and the media content selection element causes the non-audio media content to be accessed or displayed such that the audio content is able to be played and the non-audio media content is able to be viewed at the same time at the network-accessible location.

31. The device of claim 28, wherein the providing of the audio data and the non-audio media content comprises providing a playback feature of the application at the network-accessible location, wherein upon selection of the audio data the playback feature causes the audio data to be played and the non-audio media content to be accessed or displayed concurrently at the network-accessible location.

32. The device of claim 27, wherein the network-accessible location comprises a website, an email, a text message, a tweet or a document.

33. The device of claim 27, wherein the non-audio media content comprises a website, an email, a text message, a tweet or a document.

34. The device of claim 27, wherein the processor is further configured to input metadata associated with the audio data and storing the metadata at the unique address.

35. The device of claim 34, wherein the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored.

36. The device of claim 35, wherein the processor is further configured to store the audio data network address, the media content network address and the metadata as associated entries in a table of a master database along with all other previously inputted associated entries of audio data network addresses, media content network addresses and metadata on the storage database.

37. The device of claim 36, wherein the processor is further configured to provide the master database and a sorting feature of the audio commenting and publishing application to the user such that the user is able to sort the entries of the table based on the metadata, the audio data network address, the media content network address or a combination thereof.

38. The device of claim 37, wherein the metadata further comprises the audio data converted into text.

39. The device of claim 27, wherein the audio data further comprises image or video data.

40. The device of claim 27, wherein the storage database is integrated with the computing device.

41. The device of claim 27, wherein the network-accessible location is located within the computing device.

42. The device of claim 27, wherein the audio recording mechanism is integrated with the computing device.

43. A system for concurrently providing audio data and non-audio media content comprising:
   a. a storage database;
   b. non-audio media content from a network-accessible location separate from and not associated with the storage database; and
   c. a computing device coupled with the storage database and the non-audio media content, wherein the computing device comprises a processor and an application executed by the processor configured to:
      i. input audio data from an audio recording mechanism or a memory;
      ii. transmit the audio data to the storage database and storing the audio data at an audio data network address on the storage database;
      iii. capture parameters comprising a media content network address from the non-audio media content and storing the parameters with the audio data on the storage database, wherein the media content network address points to the network-accessible location; and
      iv. provide the audio data and the non-audio media content at a network-accessible location using the audio data network address and the media content network address.

44. The system of claim 43, wherein the audio data network address and the media content network address each comprise a universal resource locator.

45. The system of claim 44, wherein the providing of the audio data and the non-audio media content comprises creating a single selection element at the network-accessible location, wherein upon selection the single selection element causes the audio data to be played and the non-audio media content to be accessed or displayed concurrently at the network-accessible location.

46. The system of claim 44, wherein the providing of the audio data and the non-audio media content comprises creating an audio data selection element and a media content selection element at the network-accessible location, wherein upon selection the audio data selection element causes the audio data to be played and the media content selection element causes the non-audio media content to be accessed or displayed such that the audio content is able to be played and the non-audio media content is able to be viewed at the same time at the network-accessible location.

47. The system of claim 44, wherein the providing of the audio data and the non-audio media content comprises providing a playback feature of the application at the network-accessible location, wherein upon selection of the audio data the playback feature causes the audio data to be played and the non-audio media content to be accessed or displayed concurrently at the network-accessible location.

48. The system of claim 43, wherein the network-accessible location comprises a website, an email, a text message, a tweet or a document.

49. The system of claim 43, wherein the non-audio media content comprises a website, an email, a text message, a tweet or a document.

50. The system of claim 43, further comprising inputting metadata associated with the audio data and storing the metadata at the unique address.

51. The system of claim 50, wherein the metadata comprises one or more of the group consisting of the size of the audio data, the creation time of the audio data, the length of the audio data, the source of the audio data, the title of the audio data, the format of the audio data, the subject of the audio data, where the audio data was recorded and one or more additional network addresses indicating locations where the audio data is stored.

52. The system of claim 51, further comprising storing the audio data network address, the media content network address and the metadata as associated entries in a table of a master database along with all other previously inputted associated entries of audio data network addresses, media content network addresses and metadata on the storage database.

53. The system of claim 52, further comprising providing the master database and a sorting feature of the application to the user such that the user is able to sort the entries of the table based on the metadata, the audio data network address, the media content network address or a combination thereof.

54. The system of claim 53, wherein the metadata further comprises the audio data converted into text.

55. The system of claim 43, wherein the audio data further comprises image or video data.

56. The system of claim 43, wherein the storage database is integrated with the computing device.

57. The system of claim 43, wherein the network-accessible location is located within the computing device.

58. The system of claim 43, wherein the audio recording mechanism is integrated with the computing device.

59. The system of claim 43, wherein the network-accessible location is located within the storage database.

* * * * *